United States Patent
Dowd et al.

(10) Patent No.: US 10,173,286 B2
(45) Date of Patent: Jan. 8, 2019

(54) OPTICAL FIBER COATING TO REDUCE FRICTION AND STATIC CHARGE

(71) Applicant: Weatherford Technology Holdings, LLC, Houston, TX (US)

(72) Inventors: Edward M. Dowd, Madison, CT (US); Jason Scott Kiddy, Gambrills, MD (US); Mary Margaret Sequino, North Haven, CT (US)

(73) Assignee: Weatherford Technology Holdings, LLC, Houston, TX (US)

( * ) Notice: Subject to any disclaimer, the term of this patent is extended or adjusted under 35 U.S.C. 154(b) by 0 days.

(21) Appl. No.: 14/842,984

(22) Filed: Sep. 2, 2015

(65) Prior Publication Data

US 2016/0085023 A1   Mar. 24, 2016

Related U.S. Application Data

(60) Provisional application No. 62/052,806, filed on Sep. 19, 2014.

(51) Int. Cl.
*G02B 6/44* (2006.01)
*B23K 31/02* (2006.01)
*G02B 6/54* (2006.01)

(52) U.S. Cl.
CPC .......... *B23K 31/027* (2013.01); *G02B 6/4463* (2013.01); *G02B 6/4484* (2013.01); *G02B 6/4488* (2013.01); *G02B 6/54* (2013.01)

(58) Field of Classification Search
CPC ....................................................... G02B 6/44
See application file for complete search history.

(56) References Cited

U.S. PATENT DOCUMENTS

| 4,037,922 A * | 7/1977 | Claypoole ............ G02B 6/4486 385/104 |
| 4,213,672 A | 7/1980 | Aulich et al. |
| 4,522,464 A | 6/1985 | Thompson et al. |
| 4,640,576 A | 2/1987 | Eastwood et al. |

(Continued)

FOREIGN PATENT DOCUMENTS

JP   H08182962 A   7/1996

OTHER PUBLICATIONS

Polywater®, "FTTx Liquid Fiber Lubricant A Convenient Lubricant for Pushing or Pulling Small Cables with Spray or Wipe Application", <http://www.polywater.com/polyfttx.asp>.

(Continued)

*Primary Examiner* — Sung Pak
*Assistant Examiner* — Hoang Tran
(74) *Attorney, Agent, or Firm* — Patterson & Sheridan, LLP

(57) ABSTRACT

Certain aspects of the present disclosure provide techniques and corresponding apparatus for making armored cables with one or more optical fibers contained therein. The techniques may be utilized to control an amount of excess fiber length (EFL) in the armored cables. The techniques may also allow introduction of one or more optical fibers directly into a welding process without using an inner tube in the final armored cable. The techniques may also be utilized to reduce friction and static charge on the optical fiber(s) as the fiber(s) are pushed through one or more guide tubes that protect the fiber(s) during the welding process.

28 Claims, 10 Drawing Sheets

(56) References Cited

U.S. PATENT DOCUMENTS

| | | |
|---|---|---|
| 4,759,487 A | 7/1988 | Karlinski |
| 4,852,790 A | 8/1989 | Karlinski |
| 5,046,815 A | 9/1991 | Cain et al. |
| 5,072,870 A | 12/1991 | Ziemek |
| 5,143,274 A | 9/1992 | Laupretre et al. |
| 5,318,215 A | 6/1994 | Toya et al. |
| 5,467,420 A | 11/1995 | Rohrmann et al. |
| 5,621,841 A | 4/1997 | Field |
| 5,653,898 A | 8/1997 | Yoshie et al. |
| 5,815,908 A | 10/1998 | Wichmann |
| 5,857,255 A * | 1/1999 | Wichmann ............ B23K 31/02 228/148 |
| 6,047,586 A | 4/2000 | Hannen |
| 6,223,407 B1 | 5/2001 | Staschewski et al. |
| 6,423,389 B1 | 7/2002 | Yoshie |
| 6,522,815 B1 | 2/2003 | Staschewski |
| 6,697,556 B1 | 2/2004 | Militaru et al. |
| 7,024,081 B2 | 4/2006 | Dowd et al. |
| 7,447,406 B2 | 11/2008 | Sutehall et al. |
| 7,599,590 B2 | 10/2009 | Stocklein et al. |
| 7,646,953 B2 | 1/2010 | Dowd et al. |
| 2003/0068144 A1 | 4/2003 | Burke et al. |
| 2004/0008956 A1 | 1/2004 | Frohne et al. |
| 2004/0165844 A1 | 8/2004 | Kim et al. |
| 2005/0169588 A1 * | 8/2005 | Sutehall ............... G02B 6/4438 385/109 |
| 2005/0194578 A1 | 9/2005 | Morris |
| 2008/0033124 A1 * | 2/2008 | Jiang .................... C08F 210/06 526/65 |
| 2010/0014818 A1 | 1/2010 | Sales Casals et al. |
| 2010/0242619 A1 | 9/2010 | Le Blanc et al. |
| 2011/0235984 A1 | 9/2011 | Dowd et al. |
| 2012/0111104 A1 | 5/2012 | Taverner et al. |
| 2012/0189255 A1 | 7/2012 | Casals et al. |
| 2013/0098528 A1 | 4/2013 | Dowd et al. |
| 2013/0168126 A1 * | 7/2013 | Kuchta ................. H01B 7/361 174/102 SC |

OTHER PUBLICATIONS

European Search Report dated Feb. 16, 2016 for corresponding application No. 15184735.7.

* cited by examiner

OPTICAL FIBER COATING TO REDUCE FRICTION AND STATIC CHARGE

CROSS-REFERENCE TO RELATED APPLICATIONS

The present Application for Patent claims the benefit of U.S. Provisional Patent Application Ser. No. 62/052,806, filed Sep. 19, 2014, which is related to U.S. patent application Ser. No. 13/656,135, filed Oct. 19, 2012, which claims the benefit of U.S. Provisional Application Ser. No. 61/549,137, filed Oct. 19, 2011, all of which are herein expressly incorporated by reference.

BACKGROUND

Field

Aspects of the present disclosure generally relate to fabricating an armored cable having one or more optical fibers contained therein. More particularly, aspects of the present disclosure relate to reducing friction and static charge when inserting the one or more optical fibers in one or more guide tubes during fabrication of the armored cable.

Description of the Related Art

Downhole optical fiber cables are often manufactured using an outer armor for protection of one or more optical fibers contained therein. It is often desirable to have some amount of excess fiber length (EFL) in the armored cable, for example, to reduce strain on the optical fibers. EFL generally refers to an excess length of the fiber relative to the outer armor.

The outer armor may typically be formed by seam welding the outer armor over another (inner) tube that contains the optical fibers. The inner tube may protect the optical fiber from the extreme heat generated during the welding process. However, the use of an inner tube adds substantial cost to the armored cable.

In some cases, the optical fiber(s) may be put into an armor tube after the tube is manufactured by pushing fiber into the tube with the aid of gas or liquids. Unfortunately, this is a costly and time-consuming process and, in addition, it is difficult to achieve a desired amount of EFL.

For example, one or more optical fibers may be pushed into a metal tube when manufacturing a fiber in metal tube (FIMT), as described in U.S. Pat. No. 7,024,081 to Dowd et al., herein incorporated by reference in its entirety. During fabrication of a FIMT, the metal strip stock may be fed into the forming rollers which then pull the strip along as the strip is formed into a tube and welded at the seam. The tube may be welded somewhat larger in diameter than the finished tube size at this point. The optical fibers and gel material (if used) may be fed through guide tubes parallel to the strip stock and past the welding zone. The optical fibers are not pushed into the guide tubes; rather, the fibers get caught in the seam-welded metal tube by friction and are pulled at low tension from payoff spools through the guide tubes and into the metal tube. If used, gel will aid in pulling the fibers and can also have limited control of the overstuff, based on gel pumping volume. After welding, while still on the line, the assembly may be pulled through a sizing die to form the final FIMT diameter. A capstan may be located downstream of the die. The force involved in pulling the oversized tube through the die also stretches the tube, pulling extra fiber in from the fiber payoff spool. When the FIMT exits the capstan, the tension is reduced, and the FIMT has a small relax in length, yielding fiber overstuff. This method may be difficult to perform successfully with ¼" heavy wall cable.

As an alternative, fiber overstuff may be added to the tube by running the tube through a series of rollers, which works the metal and effectively shrinks the length of the tube. This alternative method can be used for larger tubes, like ¼", but is limited in the amount of overstuff that can be achieved and also entails extra processing.

SUMMARY

Certain aspects of the present disclosure provide techniques and corresponding apparatus for making armored cables with optical fibers contained therein. The techniques may be utilized to control an amount of effective fiber length (EFL) in the armored cables. The techniques may also allow introduction of optical fibers directly into a welding process without using an inner tube in the final armored cable. The techniques may also be utilized to reduce friction and/or static charge on the optical fibers as the fibers are pushed through a guide tube that protects the fibers during the welding process.

Certain aspects of the present disclosure provide a system for making an armored cable. The system generally includes a tube-forming device configured to seam weld an armor tubing of the armored cable; at least one guide tube disposed in a welding zone in which a seam of the armor tubing is welded, the at least one guide tube positioned to protect at least one optical fiber during welding of the seam, but is not part of the armored cable after the making; and a coating device configured to coat the at least one optical fiber with a coating, wherein the coating is configured to reduce friction between the at least one optical fiber and the at least one guide tube during an insertion operation.

Certain aspects of the present disclosure provide a method for making an armored cable. The method generally includes coating at least one optical fiber with a coating; inserting the at least one optical fiber into a guide tube, wherein the coating is configured to reduce friction between the at least one optical fiber and the guide tube during the insertion; and seam welding an armor tubing of the armored cable, wherein the guide tube is disposed in a welding zone in which a seam of the armor tubing is welded, the guide tube positioned to protect the at least one optical fiber during welding of the seam, but is not part of the armored cable after the making.

Certain aspects of the present disclosure provide an apparatus for making an armored cable. The apparatus generally includes means for coating at least one optical fiber with a coating; means for inserting the at least one optical fiber into a guide tube, wherein the coating is configured to reduce friction between the at least one optical fiber and the guide tube during the insertion; and means for seam welding an armor tubing of the armored cable, wherein the guide tube is disposed in a welding zone in which a seam of the armor tubing is welded, the guide tube positioned to protect the at least one optical fiber during welding of the seam, but is not part of the armored cable after the making.

Certain aspects of the present disclosure provide an armored cable. The armored cable generally includes a seam-welded armor tubing and at least one optical fiber disposed in the armor tubing and having a coating of graphite, molybdenum disulfide, or boron nitrite.

According to certain aspects, the optical fiber includes a core, a cladding surrounding the core, and a polymer layer surrounding the cladding, wherein the coating surrounds the polymer layer.

BRIEF DESCRIPTION OF THE DRAWINGS

So that the manner in which the above recited features of the present disclosure can be understood in detail, a more particular description, briefly summarized above, may be had by reference to aspects, some of which are illustrated in the appended drawings. It is to be noted, however, that the appended drawings illustrate only typical aspects of this disclosure and are therefore not to be considered limiting of this disclosure's scope, for the disclosure may admit to other equally effective aspects.

DETAILED DESCRIPTION

Certain aspects of the present disclosure provide techniques and corresponding apparatus for fabricating armored cables with optical fibers contained therein. The techniques may help overcome process difficulties, including control of excess fiber length (EFL) in a finished armored cable and protecting optical fibers from the extreme heat generated during the welding process.

As described herein, the techniques may allow fibers to be introduced directly into an armor tubing during a seam welding process, while eliminating the use of an inner tube, also referred to as a sheath, surrounding the fibers in the final armored cable. A desired EFL may be maintained by adjusting a feed rate of the optical fiber(s), during the welding process, as a function of the desired EFL and a feed rate of the armor tubing.

With many cable designs, a smaller inner tube, or sheath, may already contain the EFL and also acts as a shield for protecting the fibers from the heat of armor tube welding. If made of metal, the inner tube typically has a relatively thin wall, so manufacture thereof takes relatively low energy to weld with less possibility of damaging the optical fibers. The EFL of an inner tube is generally produced by means of elongation and relaxation of the tube length in the process line of fabricating the tube. Controlled pumping of a filler gel with the fibers may also be used as an aid to produce EFL. This fiber-containing inner tube is then introduced to the armor tube during the armor tube seam-welding process.

Unfortunately, these approaches may not be suitable for manufacturing a cable with optical fibers protected within a relatively thick walled armor tube, as is commonly used in downhole applications (e.g., to interrogate downhole optical sensors and/or perform distributed sensing operations).

Example Armored Cable Fabrication

According to aspects of the present disclosure, one approach to manufacturing a cable consisting of optical fibers within a heavy walled armor tube (with no inner tube) is to feed (e.g., push) the optical fibers into the armor tube during the tube welding process (e.g., as the armor tube is being formed by welding or some other process).

Figure 1:
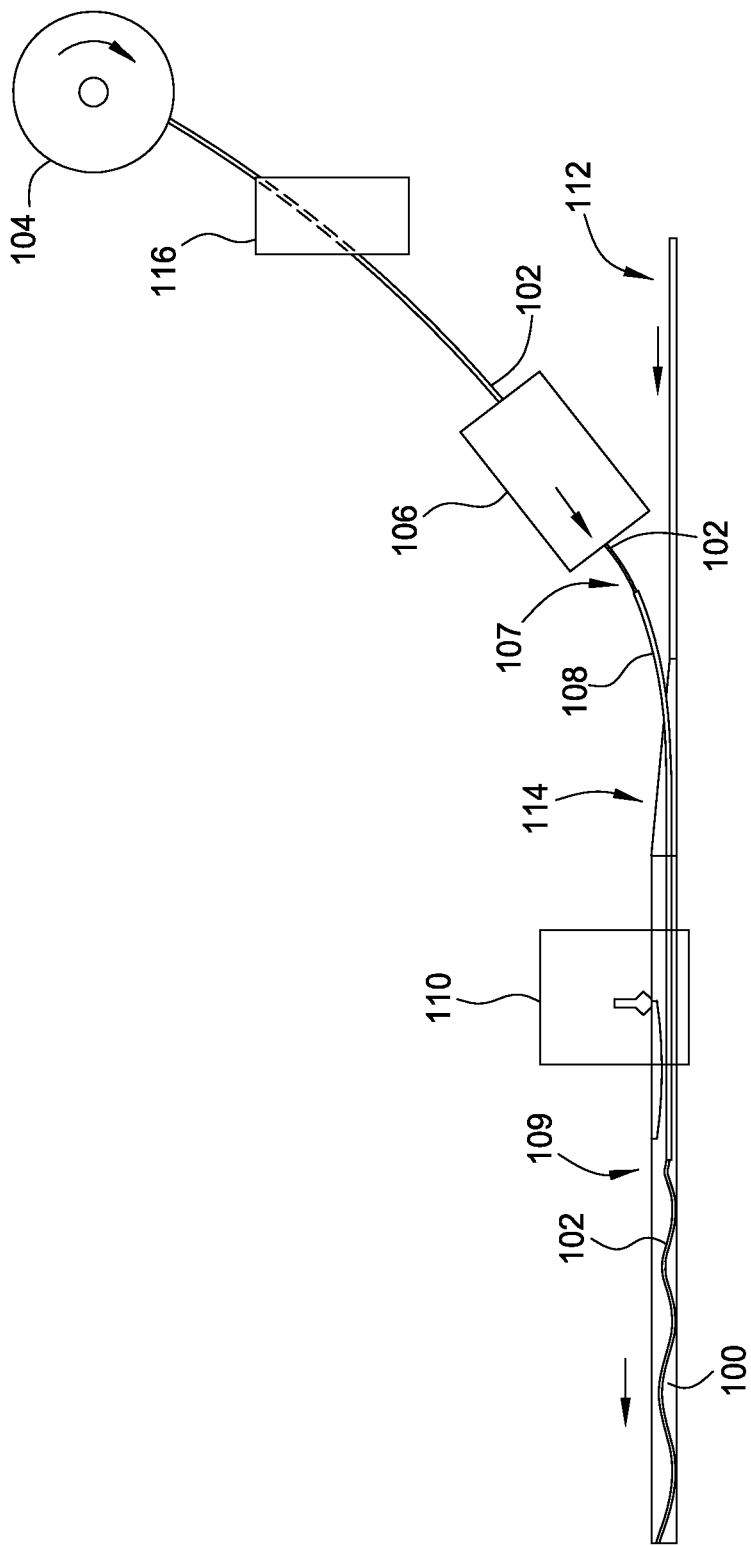
FIG. 1 illustrates a technique of making an armored cable, in accordance with one aspect of the present disclosure.

FIG. 1 illustrates fabrication of an armored cable, in accordance with one aspect of the present disclosure. The armored cable comprises an armor tube 100 and one or more optical fibers 102 (only one optical fiber is illustrated in FIG. 1 for simplicity). To form the armor tube 100, flat tube strip stock at 112 may be fed to a tube forming stage 114, which gradually rolls up the sides of the tube strip stock into a tube as the tube strip stock moves through the process at a particular tube rate. The seam (which may be a ¼ in. seam) in the nearly completed tube is then welded in the welding zone 110 to form a completed, seam-welded armor tube.

Protection of the fibers 102 from the armor tube welding process may be provided by using guide tubes 108. The fiber guide tubes 108 may be made of metal, ceramic, or any of various other suitable heat-resistant materials. The guide tubes 108 may be fixed in position in the welding zone 110, perhaps at least at or near the welding point. The guide tube's fiber entrance 107 may be located (just) before or in the armor tube's tube forming stage 114. The guide tube's fiber exit 109 may be disposed inside the welded armor tube, beyond a point at which heat from welding would damage the fibers.

The amount of EFL in the finished armored cable may be controlled by the ratio of the fiber pushing speed to the tube welding line speed (e.g., the ratio of these feed rates generally determines the amount of EFL). The fiber 102 is pushed through the guide tube 108 with a fiber feed device 106, a mechanism that can feed the fiber from a fiber source 104 at a controlled rate. The EFL can then be managed by controlling the fiber's feed rate as compared to the armor tube welding line speed (i.e., the tube rate).

Figure 2:
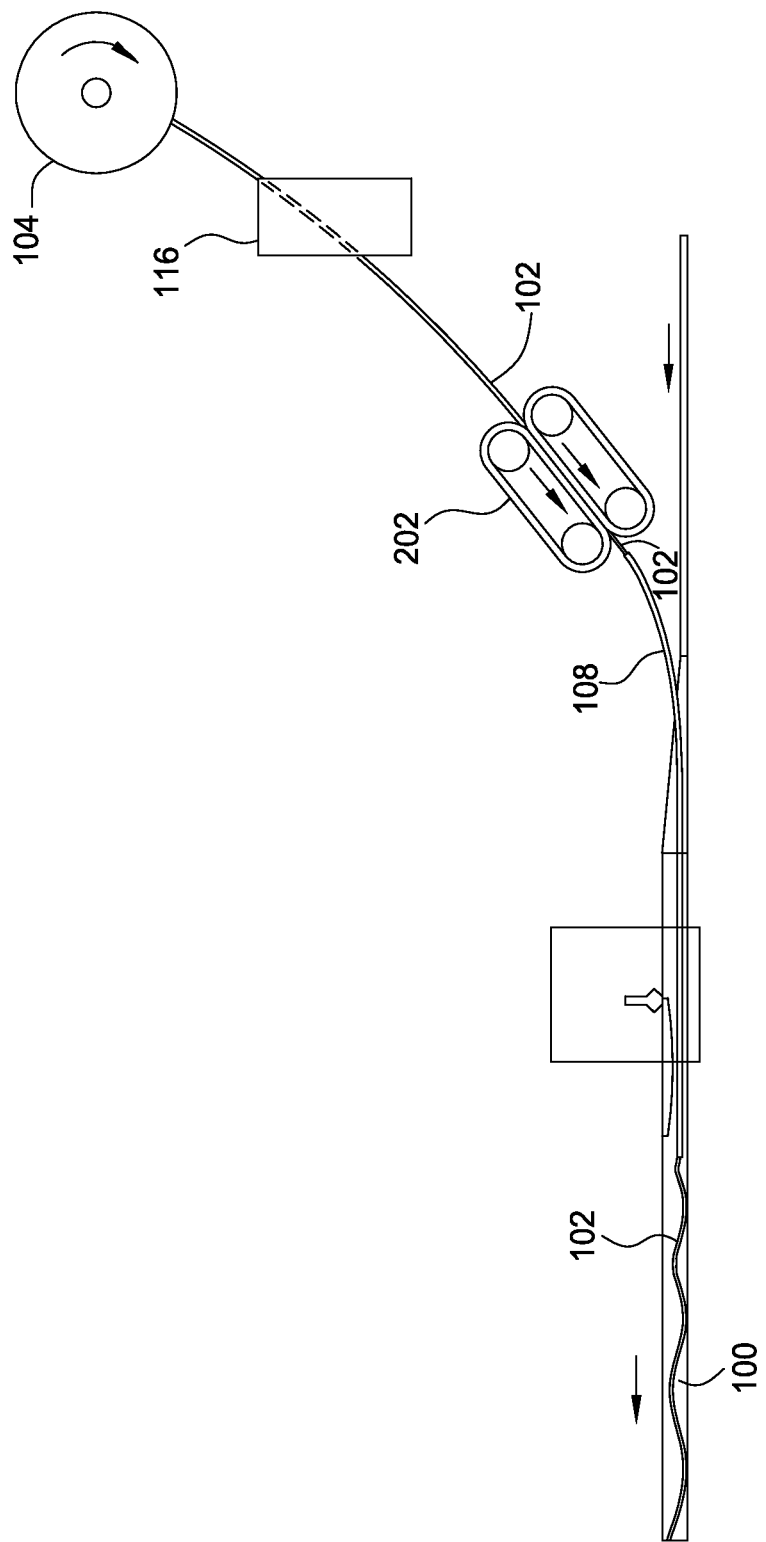
FIG. 2 illustrates a technique of making an armored cable using a banded tractor feed mechanism as a fiber feed mechanism, in accordance with one aspect of the present disclosure.

As illustrated in FIG. 2, the mechanism that feeds fibers into the guide tubes may be a banded tractor feed mechanism 202 for pulling the fibers from the fiber source 104 (e.g., one or more spools) and pushing the fibers into the guide tubes 108. Alternatively, a roller/capstan, a gas venturi, or any other device that can push the fibers into the guide tubes 108 may be used as a feed mechanism. Pumping a viscous gel material inside the fiber guide tube 108 will also feed fiber into the armor tube process.

The optical fiber 102 may be composed of any of various suitable materials, such as glasses and/or plastics (e.g., silica, phosphate glass, glass and plastic, or solely plastic). Also, a multi-mode, birefringent, polarization-maintaining, polarizing, multi-core, flat or planar (where the optical waveguide is rectangular shaped), or other optical waveguide may be used if desired. The fiber or waveguide may contain one or more sensors within (e.g., laser written directly) or attached thereto (e.g., spliced), including Bragg grating type sensors.

Figure 3:
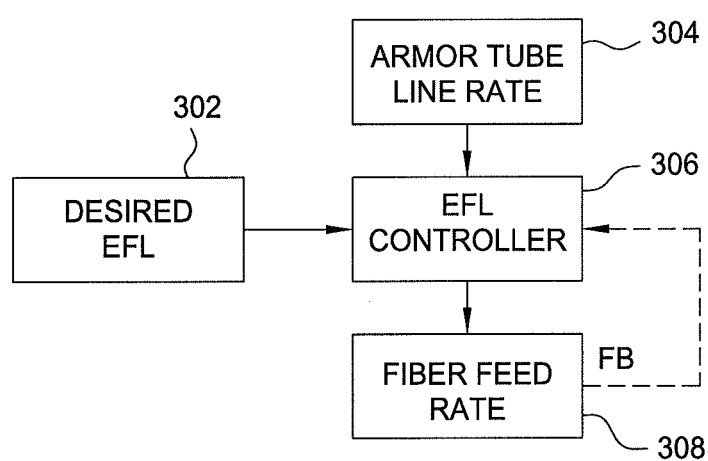
FIG. 3 illustrates an example control algorithm for controlling excess fiber length (EFL) when making an armored cable, in accordance with one aspect of the present disclosure.

FIG. 3 illustrates an example control algorithm for controlling excess fiber length (EFL) when making an armored cable, in accordance with one aspect of the present disclosure. As illustrated, an EFL controller 306 may control the fiber feed rate 308 (i.e., the rate at which the optical fibers are fed into the process for forming the armor tubing) based on a desired EFL 302 and the armor tube line rate 304 (i.e., the rate at which material for forming the armor tubing is fed into the formation process). As noted above, more generally, the EFL controller may control the ratio of the feed rates 304 and 308 to achieve the desired EFL 302. For certain aspects, as illustrated in FIG. 3, the actual fiber feed rate 308 may be fed back to the EFL controller 306, for a closed loop control algorithm.

Figure 4:
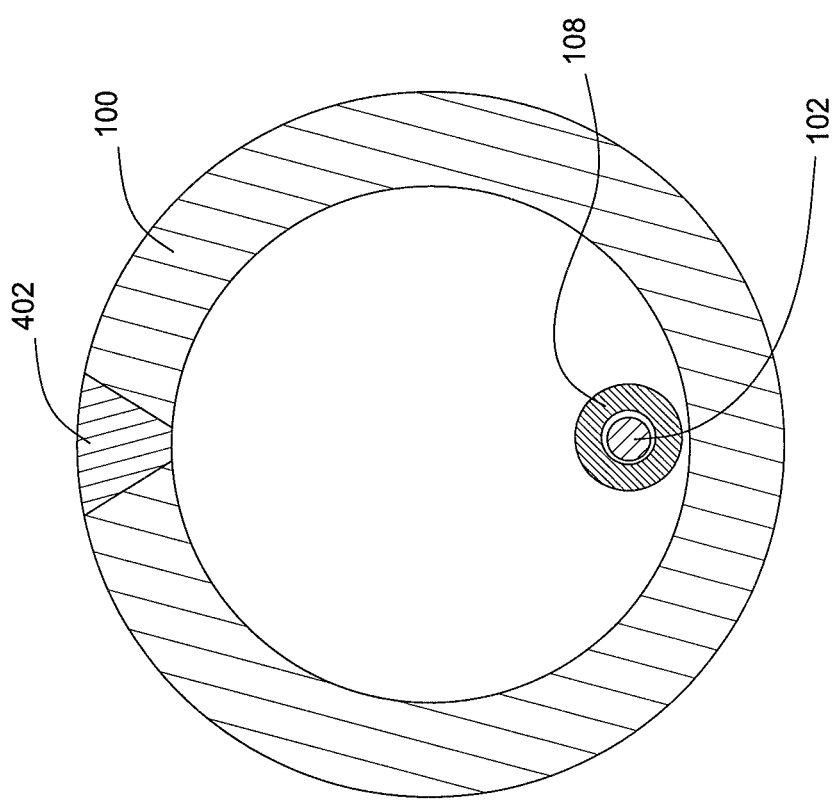
FIG. 4 illustrates an example cross-sectional view of a single optical fiber in a fiber guide tube in a welding zone for forming a seam-welded armor tube, in accordance with one aspect of the present disclosure.

FIG. 4 illustrates an example cross-sectional view of a single optical fiber 102 in a fiber guide tube 108 in the welding zone for forming a welded armor tube having a seam 402, in accordance with one aspect of the present disclosure. For certain aspects as shown, the guide tube 108 may position the optical fiber 102 opposite from the location of the welding zone, in an effort to further prevent damage to the optical fiber during the welding process.

Figure 5:
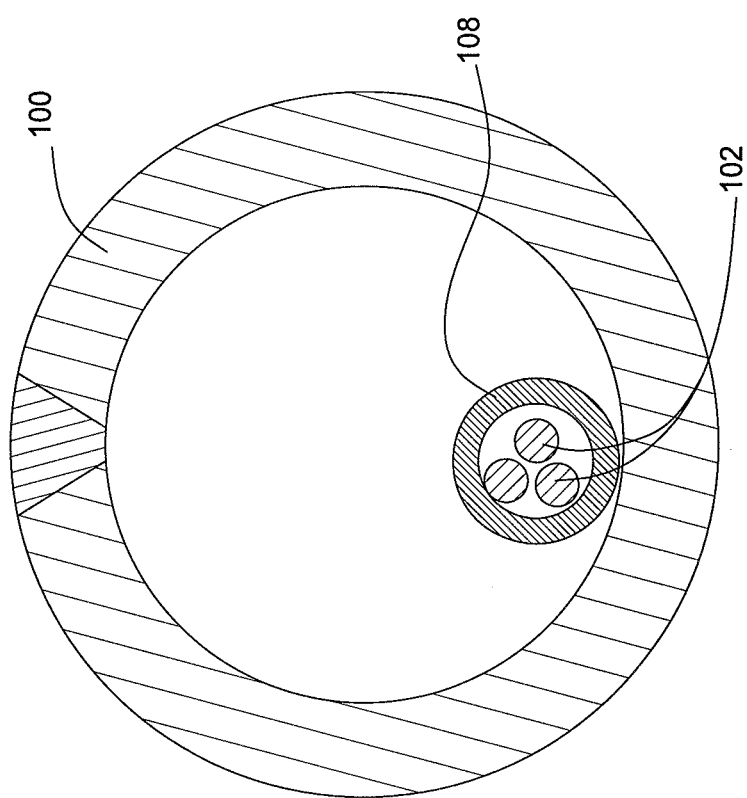
FIG. 5 illustrates an example cross-sectional view of multiple optical fibers in a fiber guide tube in a welding zone for forming a welded armor tube, in accordance with one aspect of the present disclosure.

As illustrated in FIG. 5, the fiber feed/guide tube process may be made to feed multiple optical fibers at once into the armor tube welding process. This can be done with multiple fibers 102 inside each of one or more guide tubes 108 as shown, with a single optical fiber in each of multiple guide tubes, as portrayed in FIG. 7, described below, or with any combination thereof.

Figure 6:
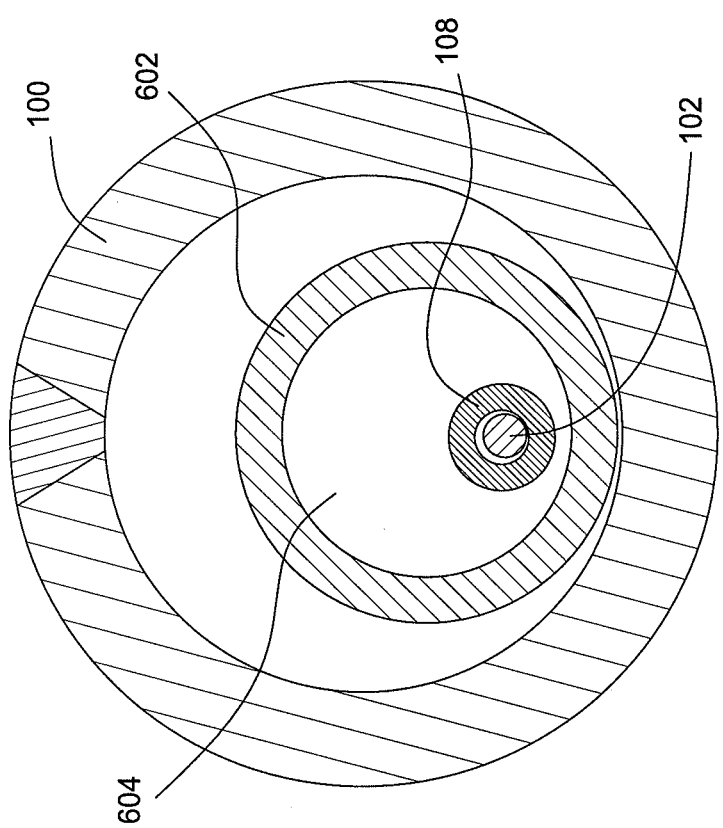
FIG. 6 illustrates an example cross-sectional view of optical fiber in a fiber guide tube, surrounded by an outer guide tube, in a welding zone for forming a welded armor tube, in accordance with one aspect of the present disclosure.

As depicted in FIG. 6, one or more additional (outer) tubes 602 may be placed around the fiber guide tube(s) 108. The space 604 between the additional tubes 602 and the fiber guide tube(s) 108 may permit fluid flow in an effort to cool the fiber(s) 102 during the welding process. For example, an inert gas purge in this space 604 may be used to provide additional heat protection for the fiber(s) in the welding zone. The space 604 may also permit flow of other materials, such as gel filling, adhesives, or lubricants.

Figure 7:
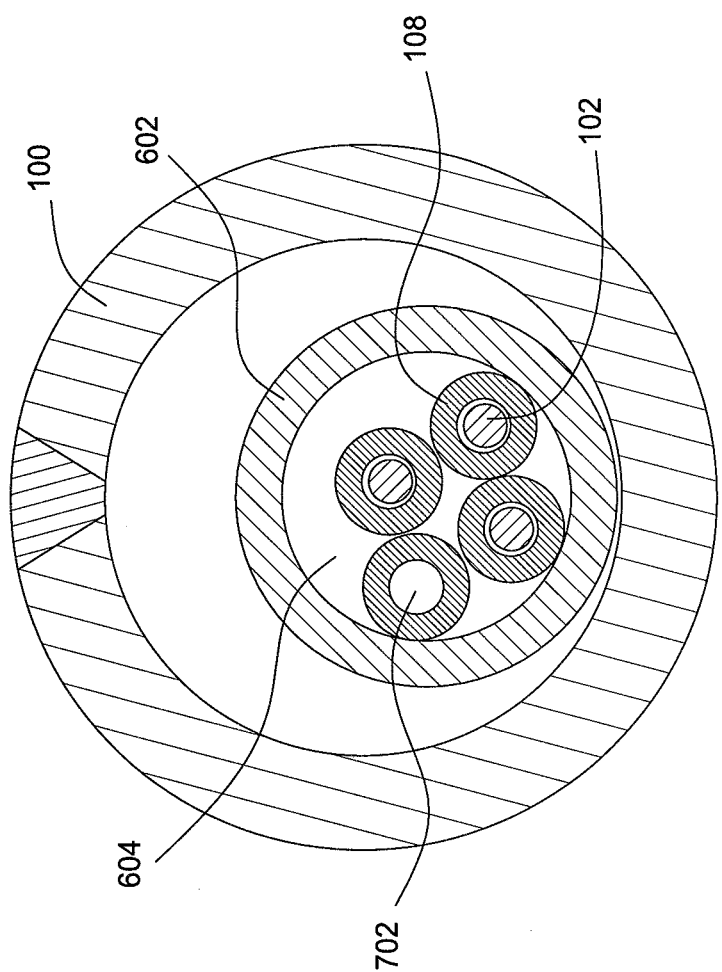
FIG. 7 illustrates an example cross-sectional view of optical fibers in multiple fiber guide tubes, surrounded by an outer guide tube, in a welding zone for forming a welded armor tube, in accordance with one aspect of the present disclosure.

As shown in FIG. 7, one or more additional inner guide tubes 702 may also be used for addition of gel filling, adhesives, lubricants, etc. around the optical fibers 102. These materials may be continuously or intermittently flowing when added. The additional inner guide tubes 702 may not be used for feeding optical fibers into the armor tube. The additional inner guide tubes 702 may be made of metal, ceramic, or any of various other suitable heat resistant materials.

Figure 8:
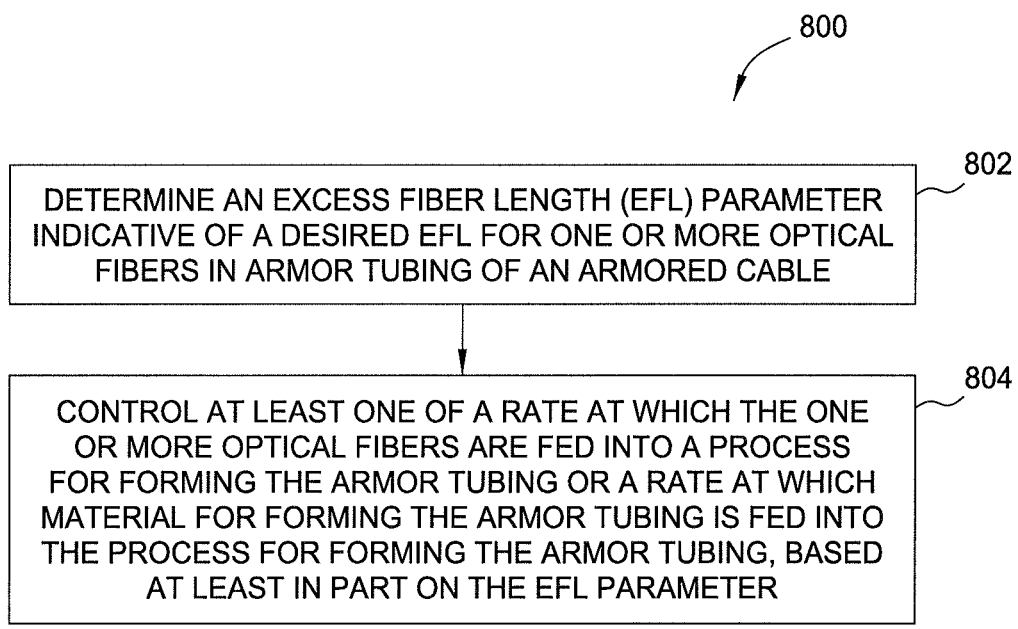
FIG. 8 is a flow diagram of example operations for controlling processing rates during fabrication of an armored cable, in accordance with one aspect of the present disclosure.

FIG. 8 is a flow diagram of example operations 800 for controlling processing rates during fabrication of an armored cable, in accordance with one aspect of the present disclosure. The operations 800 may begin, at 802, by determining an EFL parameter indicative of a desired EFL for one or more optical fibers in armor tubing of the armored cable. At 804, at least one of: (1) a rate at which the one or more optical fibers are fed into a process for forming the armor tubing; or (2) a rate at which material for forming the armor tubing is fed into the process for forming the armor tubing may be controlled, based at least in part on the EFL parameter determined at 802. The process for forming the armor tubing may involve seam welding of the armor tubing.

According to certain aspects, the controlling at 804 includes controlling the rate at which the one or more optical fibers are fed into the process as a function of the EFL parameter and the rate at which the material for forming the armor tubing is fed into the process. For certain aspects, the rate at which the one or more optical fibers are fed into the process is controlled by controlling a fiber feed device. The fiber feed device may comprise a fiber feed capstan, a banded tractor pulling/pushing mechanism, a fluid pump (e.g., a viscous gel pump), or a gas venturi.

According to certain aspects, the controlling at 804 includes controlling the rate at which the one or more optical fibers are fed into one or more inner guide tubes that protect the one or more optical fibers during the process. The inner guide tubes are not part of the final armored cable (i.e., the armored cable after the making). For certain aspects, a plurality of optical fibers are fed into a single inner guide tube. At least one outer guide tube may surround the one or more inner guide tubes. For certain aspects, at least one of the inner guide tubes is used to convey at least one of a gel filling, adhesive, lubricant, or inert gas into the armor tubing.

Example Optical Fiber Coating

Conventional optical fibers may be wrapped in one or more layers of protective sheathing. This protective sheathing may also stiffen the resulting structure, making sheathed optical fibers easier to push into tubes during fabrication of an optical cable. These and other optical fibers may be coated in polymers, such as polyimide or acrylate. Such optical fiber coatings have friction coefficients which make pushing the optical fibers into tubes (e.g., the guide tubes 108) difficult without the sheath. These optical fiber coatings allowed mobility of the fiber having extra fiber length during use, but were not intended to serve to reduce friction during fabrication as the stiffer sheath would allow the optical fibers to be installed easily. The friction builds up as longer lengths of optical fiber are pushed into the tubes. Frictional forces while pushing a polymer-coated optical fiber into a tube may also cause such a fiber to bind inside the tube, resulting in the fiber buckling at the fiber feed mechanism. Also, the conventional optical fiber coatings, when slid along a surface or pushed into tubes, build up a static charge, which further aggravates the frictional forces when pushing. In certain cases, the polymer coating of the optical fiber is under-cured during production. Heat cycling of these under-cured coatings, combined with frictional forces, may also cause the optical fibers to bind inside the armored cable.

Accordingly, what is needed are techniques and apparatus to reduce optical fiber coating friction, reduce or dissipate static electric charge, and prevent an optical fiber coating from adhering to other optical fibers and to the inner walls of a tube.

According to certain aspects of the present disclosure, coating the optical fibers prior to feeding the optical fibers into the guide tube 108 during the tube welding process reduces the frictional forces and static buildup and allows the optical fibers to be fed without a sheath for stiffening the fibers. Coating of the fibers 102 to reduce friction and static charge may be performed by a coating device 116 prior to pushing the fibers 102 into the guide tube 108. Coating the fibers 102 may be applied in a separate process or concurrently with fiber pushing. This lubricating coating may be applied over the existing polymer coating of conventional optical fibers, which are not intended to serve to reduce friction during fabrication. When a lubricating coating is applied over the existing polymer coating, the lubricating coating also addresses friction related to the under-cured existing polymer coatings of the optical fibers.

According to certain aspects, the lubricating coating of the fibers 102 may be electrically conductive. This provides a conductive path, preventing or dissipating the buildup of static electricity when pushing the fibers 102 into the guide tube 108. Lubricating coatings like polytetrafluoroethylene (PTFE, also known as TEFLON), while reducing the friction, still allow for a buildup of static electricity between surfaces.

According to certain aspects, the lubricating coating of the fibers 102 may comprise a high-temperature-rated substance. As used herein, a high-temperature-rated substance generally refers to a substance capable of withstanding up to at least 300 degrees Celsius without degradation. Downhole operations, as well as the welding operation during fabrication, may subject the lubricating coating to significant heat. Non-limiting examples of lubricating coatings that are effective high-temperature lubricants include graphite, molybdenum disulfide ($MoS_2$), and boron nitride coatings. Other commercially available high-temperature lubricants or coatings may also be used.

According to certain aspects, the lubricating coating of the fibers 102 may comprise a dry lubricant. Using a liquid lubricant to aid in pushing the fiber 102 into the guide tube 108 is possible, but may introduce surface tension and other frictional forces. In addition, the liquid lubricant may be absorbed by the polymer coating of conventional fibers over time, causing the polymer coating to swell, which may be undesirable. Alternatively, the inside surface of the guide tube 108 may be coated with the lubricant, and the fiber(s) 102 may not have the lubricating coating applied thereto.

Figure 9:
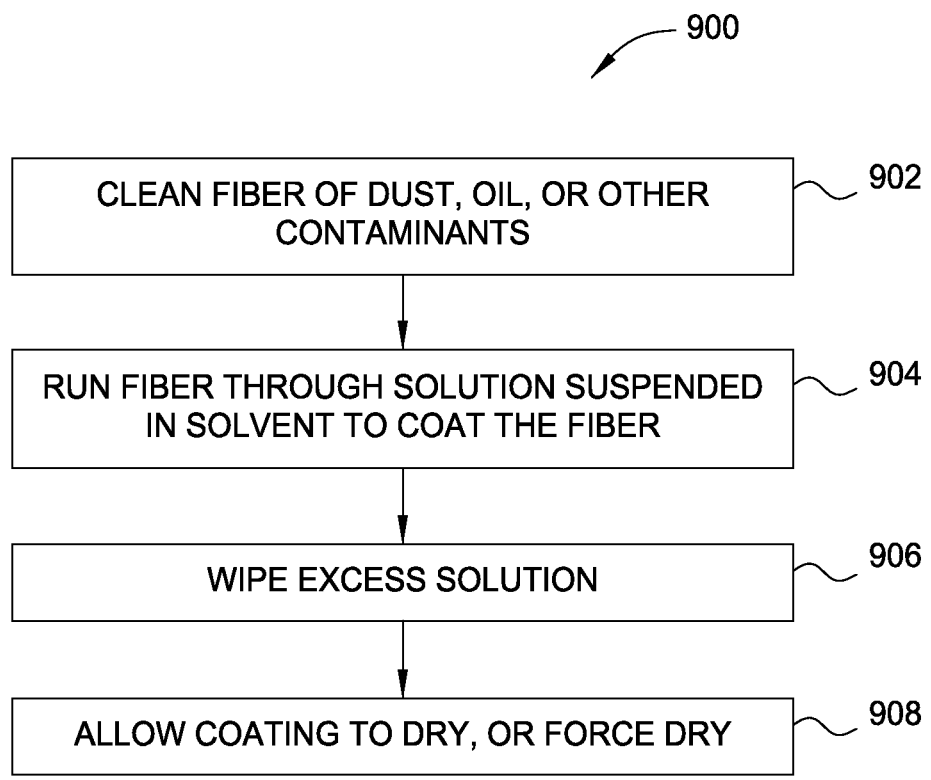
FIG. 9 is a flow diagram of example operations for coating an optical fiber to reduce friction and static, in accordance with one aspect of the present disclosure.

FIG. 9 is a flow diagram of example operations 900 for coating an optical fiber to reduce friction and static, in accordance with one aspect of the present disclosure. The operations 900 may begin, at 902, by cleaning the fiber(s) 102 of any dust, oil, or other contaminants. This cleaning may be applied to the existing polymer coating of the fiber(s) 102. At 904, the cleaned fiber(s) 102 are run through a colloidal solution of the lubricant, such as graphite, suspended in a solvent. Alternatively, the solution may be applied as a spray, or by using various dry applications. At 906, the lubed fiber(s) 102 are wiped of excess solution by, for example, sponges. At 908, the solution remaining on the fiber(s) 102 may be allowed to dry, leaving a thin coating (e.g., a film) of the lubricant on the fiber(s). For certain aspects, this drying may be accelerated by force drying with a heater (e.g., a blow dryer), which may be used to drive away solvent from the solution.

Figure 10:
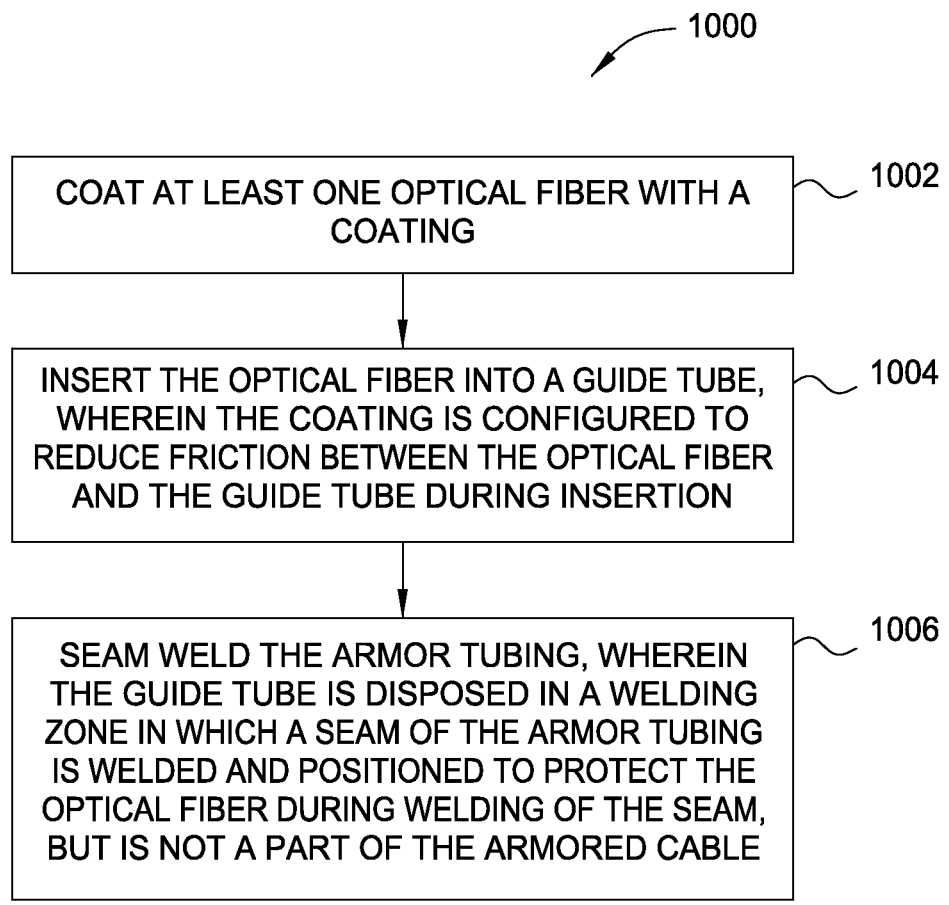
FIG. 10 is a flow diagram of example operations for making an armored cable, in accordance with one aspect of the present disclosure.

FIG. 10 is a flow diagram of example operations 1000 for making an armored cable, in accordance with one aspect of the present disclosure. The operations 1000 may begin, at 1002, by coating at least one optical fiber (e.g., optical fiber 102) with a lubricating coating. At 1004, the optical fiber is inserted into a guide tube (e.g., guide tube 108), without a separate protective sheathing (i.e., the at least one optical fiber being inserted into the guide tube is not surrounded by a sheath or metal tubing before the insertion). The lubricating coating is configured to reduce friction between the optical fiber and the guide tube during the insertion operation at 1004. At 1006, the armor tubing is seam welded. The guide tube is disposed in a welding zone in which a seam of the armor tubing is welded and is positioned to protect the optical fiber during welding of the seam. The guide tube, however, is not a part of the armored cable after the armored cable is made.

As described herein, new cable process techniques are provided that may allow for manufacture of armor tube cables that contain optical fibers without employing an inner tube for containing the fibers. This eliminates the traditional processing of optical fibers inside an inner tube and reduces the overall cost of the cable. The process allows manufacture of armored cables with single or multiple fibers having a uniformly distributed EFL and that may include gel fillers around the fiber(s).

The techniques presented herein may have advantages over previous solutions of inserting the optical fiber after the cable armor tube is formed, which are typically limited in the continuous length of cable which can be practically manufactured. The EFL in previous processes is not easily controlled and may not be uniformly distributed along the cable length.

While the foregoing is directed to aspects of the present disclosure, other and further aspects of the disclosure may be devised without departing from the basic scope thereof, and the scope thereof is determined by the claims that follow.

The invention claimed is:

1. A system for making an armored cable, comprising:
a tube-forming device configured to seam weld an armor tubing of the armored cable;
at least one guide tube disposed in a welding zone in which a seam of the armor tubing is welded, the at least one guide tube positioned to protect at least one optical fiber during welding of the seam, but is not part of the armored cable after the making; and
a coating device configured to coat the at least one optical fiber with a coating, wherein the coating is configured to reduce friction between the at least one optical fiber and at least an entrance of the at least one guide tube during insertion of the at least one optical fiber into the at least one guide tube.

2. The system of claim 1, wherein the coating is electrically conductive.

3. The system of claim 1, wherein the coating comprises a dry lubricant.

4. The system of claim 1, wherein the optical fiber coating comprises a high-temperature-rated substance capable of withstanding up to at least 300 degrees Celsius.

5. The system of claim 1, wherein the coating comprises graphite, molybdenum disulfide, or boron nitride.

6. The system of claim 1, wherein the coating device is configured to apply a colloidal solution to the at least one optical fiber to coat the at least one optical fiber.

7. The system of claim 6, wherein the coating device is configured to apply the colloidal solution by spraying the colloidal solution on the at least one optical fiber.

8. The system of claim 6, wherein the coating device is configured to apply the colloidal solution by running the at least one optical fiber through the colloidal solution and allowing the colloidal solution to dry before the insertion operation.

9. The system of claim 6, further comprising a heating device configured to apply heat to dry the colloidal solution.

10. A method for making an armored cable, comprising:
coating at least one optical fiber with a coating;
inserting the at least one optical fiber into a guide tube, wherein the coating is configured to reduce friction between the at least one optical fiber and at least an entrance of the guide tube during the insertion; and
seam welding an armor tubing of the armored cable, wherein the guide tube is disposed in a welding zone in which a seam of the armor tubing is welded, the guide tube positioned to protect the at least one optical fiber during welding of the seam, but is not part of the armored cable after the making.

11. The method of claim 10, wherein the coating is electrically conductive.

12. The method of claim 10, wherein the coating comprises a dry lubricant.

13. The method of claim 10, wherein the coating comprises a high-temperature-rated substance capable of withstanding up to at least 300 degrees Celsius.

14. The method of claim 10, wherein the coating comprises graphite, molybdenum disulfide, or boron nitrite.

15. The method of claim 10, wherein the coating comprises applying a colloidal solution to the at least one optical fiber.

16. The method of claim 15, wherein the applying comprises spraying the colloidal solution on the at least one optical fiber.

17. The method of claim 15, wherein the applying comprises:
    running the at least one optical fiber through the colloidal solution; and
    allowing the colloidal solution to dry before the insertion.

18. The method of claim 15, further comprising applying heat to dry the colloidal solution.

19. An apparatus for making an armored cable, comprising:
    means for coating at least one optical fiber with a coating;
    means for inserting the at least one optical fiber into a guide tube, wherein the coating is configured to reduce friction between the at least one optical fiber and at least an entrance of the guide tube during the insertion; and
    means for seam welding an armor tubing of the armored cable, wherein the guide tube is disposed in a welding zone in which a seam of the armor tubing is welded, the guide tube positioned to protect the at least one optical fiber during welding of the seam, but is not part of the armored cable after the making.

20. The apparatus of claim 19, wherein the coating is electrically conductive.

21. The apparatus of claim 19, wherein the coating comprises a dry lubricant.

22. The apparatus of claim 19, wherein the coating comprises a high-temperature-rated substance capable of withstanding up to at least 300 degrees Celsius.

23. The apparatus of claim 19, wherein the coating comprises graphite, molybdenum disulfide, or boron nitrite.

24. The apparatus of claim 19, wherein the means for coating is configured to apply a colloidal solution to the at least one optical fiber.

25. The apparatus of claim 24, wherein the means for coating is configured to apply the colloidal solution by spraying the colloidal solution on the at least one optical fiber.

26. The apparatus of claim 24, wherein the means for coating is configured to apply the colloidal solution by:
    running the at least one optical fiber through the colloidal solution; and
    allowing the colloidal solution to dry before the insertion.

27. The apparatus of claim 24, further comprising means for heating the at least one optical fiber to dry the colloidal solution.

28. The method of claim 10, wherein the coating is configured to reduce friction between the at least one optical fiber and the entire length of the guide tube during the insertion.

* * * * *